United States Patent Office 3,444,049
Patented May 13, 1969

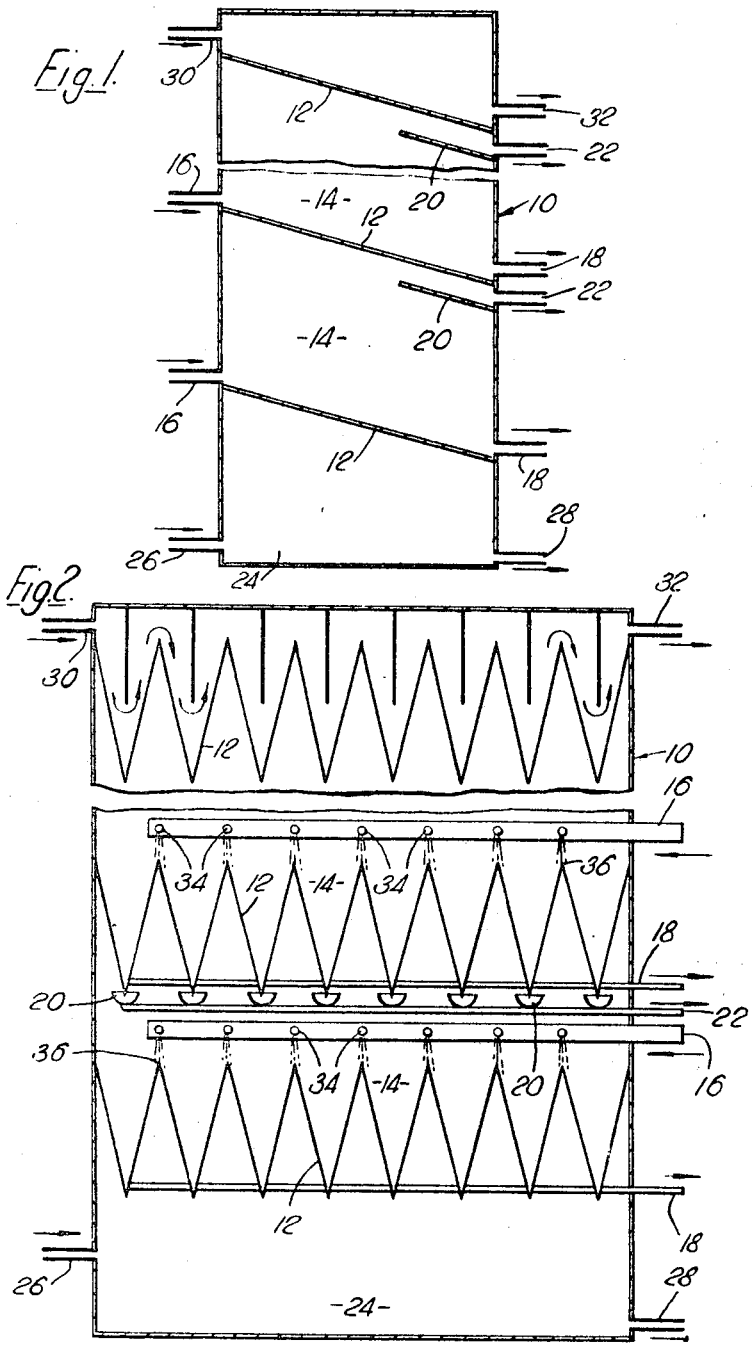

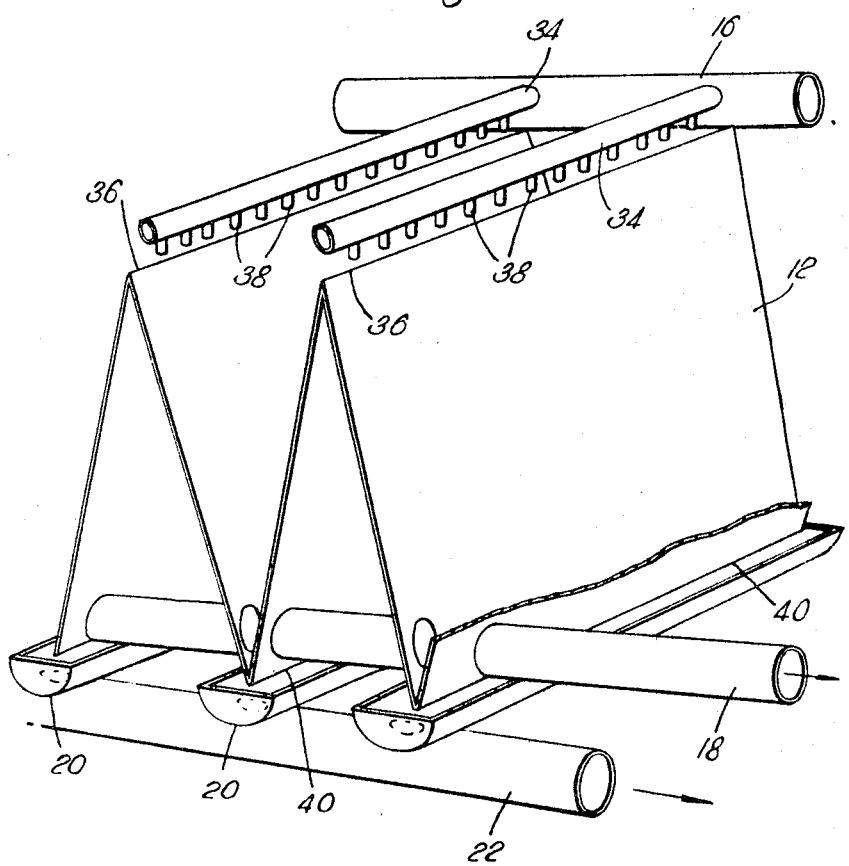

3,444,049
VERTICAL MULTISTAGE DISTILLATION APPARATUS
Roy Starmer and Malcolm Hutchinson, Northumberland, England, assignors, by mesne assignments, to Weir Westgarth Limited, Glasgow, Scotland, a British company
Filed Aug. 23, 1962, Ser. No. 219,012
Int. Cl. C02b 1/06; B01d 3/28
U.S. Cl. 202—172                 11 Claims This invention relates to multi-stage evaporators, particularly land-based evaporators for producing distilled water by the evaporation of saline water or brackish water.

Many designs of evaporator suffer from the two-fold disadvantage that they are structurely complex and entail the use of large quantities of metal, while the heat transfer coefficient between the liquid to be evaporated and the heating medium is not as high as could be desired. It is accordingly an aim of the present invention to devise an evaporator which is a distinct improvement in these two respects, and according to the invention a multi-staged evaporator comprises a vessel divided internally into a number of compartments by partitions serving as heat-transfer surfaces, in which means are provided for feeding liquid to be evaporated onto one side of each of the said surfaces, and in which distillate-collecting means are arranged on the other side of each surface, the arrangement being such that vapour produced from the liquid can flow from one heat-transfer surface to another heat-transfer surface where, in operation, it is condensed by giving up heat to liquid on the other side of the surface, the said liquid thereby being partially evaporated.

Preferably, the means for feeding liquid onto one side of each partition are constructed and arranged to maintain only a thin film or shallow stream of liquid on the partition so as to improve the heat transfer coefficient between the vapour and the liquid. The partitions themselves can take a number of different forms, and can, for example, comprise corrugated walls of zig-zag cross-section or large numbers of open-ended tubes held together by a support resembling a tube-plate.

Figure 4:
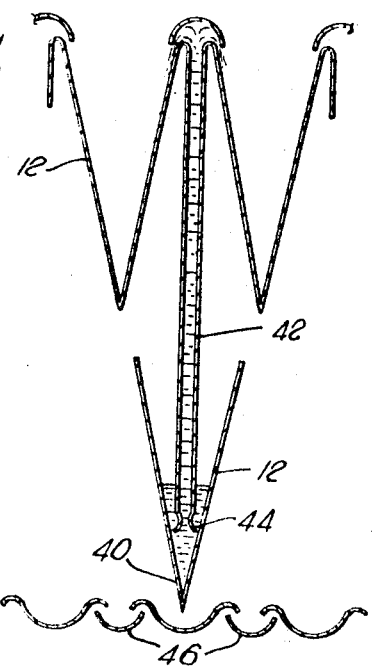
Figure 5:
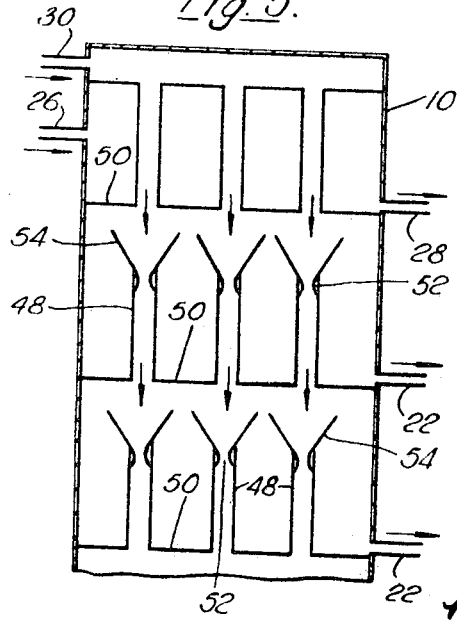
Figure 6:
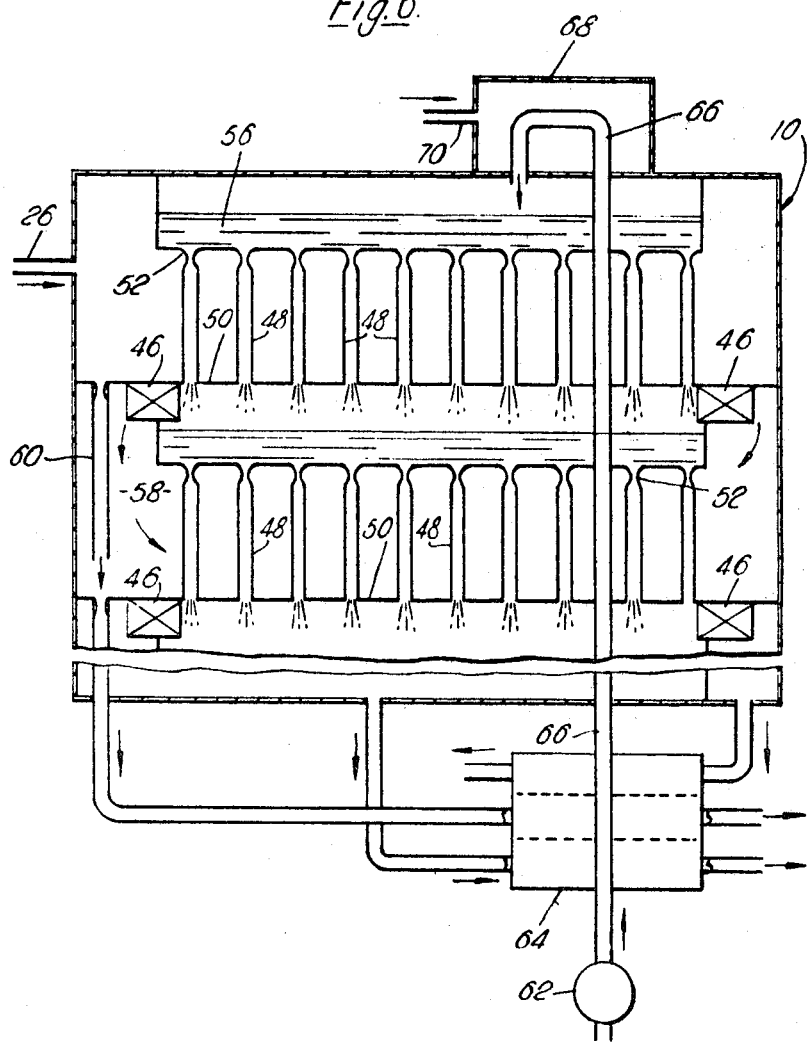
Figure 7:
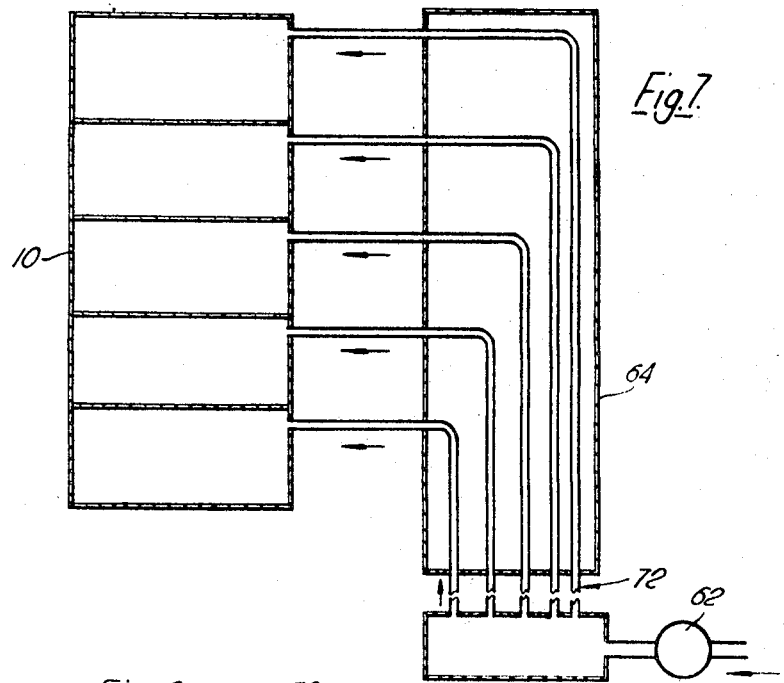
Figure 8:
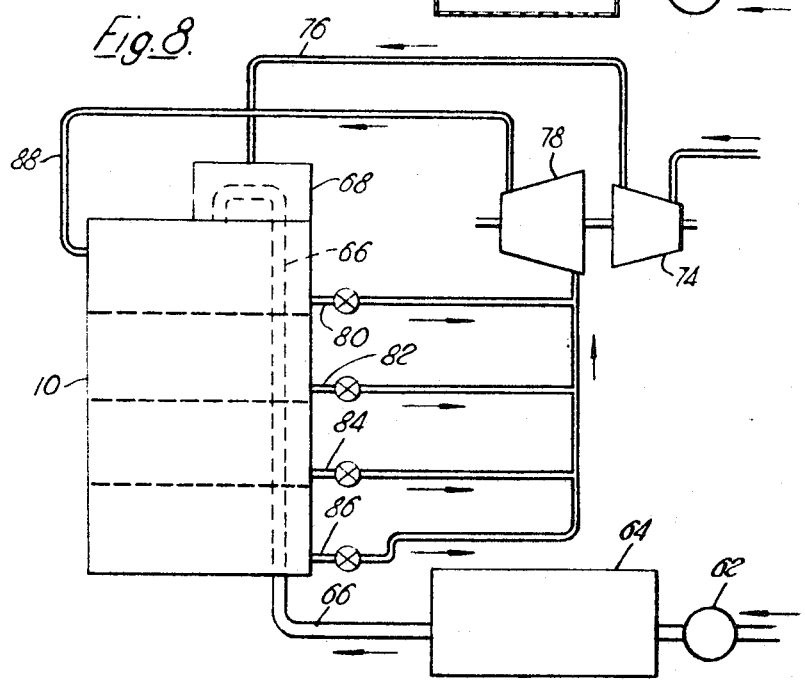

In order that the invention may be thoroughly understood, some examples of evaporators in accordance with it will now be described with reference to the accompanying drawings, in which:

FIGURE 1 is a diagrammatic vertical section through part of one form of evaporator;
FIGURE 2 is a diagrammatic vertical section through a second form of evaporator;
FIGURE 3 is an enlarged perspective view of a portion of the evaporator shown in FIGURE 2;
FIGURE 4 is an enlarged vertical section illustrating a modification to the evaporator shown in FIGURES 2 and 3;
FIGURE 5 is a diagrammatic vertical section similar to FIGURE 1 through another form of evaporator;
FIGURE 6 is a diagrammatic vertical section similar to FIGURE 2 through a fourth form of evaporator;
FIGURE 7 is a simple diagram illustrating a modification to the evaporators shown in FIGURES 1–6; and
FIGURE 8 is a diagrammatic view of yet another evaporator in accordance with the invention.

The evaporator shown in FIGURE 1 of the drawings comprises a rectangular vessel 10 divided internally by sloping partition walls 12 into a number of compartments or stages 14 arranged one above the other. The partitions 12 are made of a good heat-conducting sheet metal and serve as heat transfer surfaces for the transfer of heat to brine to be evaporated which is supplied to the upper surfaces of the partitions through brine inlets 16. Brine outlets 18 are provided immediately above the lower ends of the partitions, while distillate-collecting troughs or trays 20 are arranged immediately below the said lower ends. Distillate outlets 22 permit the withdrawal of distillate which collects in the troughs or trays 20. In addition, a steam inlet pipe 26 is provided in the lowermost compartment 24 of the vessel.

In operation of the evaporator, raw brine which may or may not be preheated enters the vessel 10 through each of the brine inlets 16 and moves downwards in a shallow stream over the upper surfaces of the partitions 12. At the same time, steam from a boiler or other convenient source of supply enters the first stage 24 of the evaporator through the steam inlet pipe 26. The steam rises into contact with the lowermost partition 12 and thus gives up heat to the downwardly-flowing brine film on the upper slanting surface of the partition, with the result that some of the brine is evaporated at a lower pressure and temperature than that prevailing in the first stage 24. The vapour which is produced by the portion of the brine which is evaporated passes upwards away from the lowermost partition 12 separating the first stage and the second stage and gives up heat to the brine film on the upper slanting surface of the next partition 12 separating the second stage from the third stage. The vapour is thereby condensed on the lower slanting surface of the latter partition 12 and moves downwards as distillate over that surface into the distillate-collecting tray 20 arranged immediately beneath its lower end. From here the distillate is removed by means of the distillate-extraction outlet 22 provided for the second stage.

The brine which is not evaporated on the upper slanting surface of the lowermost partition 12 collects in the valley formed by the lower end of the partition and the side wall of the vessel 10, and is removed therefrom by means of the brine outlet 18. Similarly, steam in the first stage or compartment 24 which is condensed on the lower slanting surface of the lowermost partition 12 falls to the bottom of the compartment and is removed through a condensate outlet 28. Venting takes place in each stage through vent holes which are not shown in the drawings.

The operation described above in connection with the first and second stages continues throughout all the subsequent stages of the evaporator, except that the temperature and pressure within each stage is always less than that within the immediately preceding stage. Thus, the brine film on the upper surface of each partition 12 (apart from the uppermost and lowermost partitions 12) is heated by vapour produced by the evaporation of brine in the stage below the partition, and the distillate and unevaporated brine are continuously removed from the vessel 10 through the outlets 22 and 18. In the case of the first stage 24, the heating medium is steam from an external source and not vapour produced from brine within the vessel 10, while the final stage at the top of the vessel has an inlet 30 and an outlet 32 for the passage of a cooling liquid which condenses vapour in the stage immediately below.

It will thus be seen that the vapour flow between successive partitions 12 takes place freely over the full cross-section of the evaporator vessel 10, and that this arrangement obviates the necessity of providing vapour-transport tubes which are a feature of many multi-stage evaporators used hitherto. The evaporator is therefore more compact and cheaper to produce than these earlier forms of evaporator. On the other hand, the evaporator illustrated in FIGURE 1 is thermo-dynamically advantageous so that it combines good performance with ease and cheapness of manufacture in a way which makes it considerably more attractive than other designs of evaporator.

Another advantage of the evaporator shown in FIGURE 1 is that the heat transfer between the brine and the heating medium takes place across partitions 12 having flat metal surfaces and that the brine forms only a thin film or shallow stream on the upper sides of the heat transfer surfaces. This has the beneficial result that the number and length of fluid-conveying tubes and pipes in the evaporator is reduced, while at the same time the arrangement allows higher heat transfer co-efficients to be obtained. A further advantage is that the evaporator can be built up using standard sections or components which have been previously manufactured and held in stock.

The evaporator shown in FIGURES 2 and 3 has many resemblances to that shown in FIGURE 1, and the operation of both evaporators is essentially the same. In this case however the vessel 10 is divided internally into compartments 14 by accordion-style partitions 12 of zig-zag cross-section. As in FIGURE 1, the zig-zag partitions 12 are made of good heat-conducting sheet metal and serve as heat transfer surfaces for the transfer of heat to brine to be evaporated which is supplied to the upper slanting surfaces of all the partitions 12 except the uppermost one through brine feed tubes 16 provided with distributing branches or headers 34. Each header 34 is located directly above a crest 36 of one of the partitions 12, and has a number of downwardly-extending spray nozzles 38 (see FIGURE 3) arranged to spray brine evenly onto the crests 20 beneath them. By this means the brine delivered by the nozzles 38 forms a thin downwardly-moving film on the upper slanting surfaces of the partitions 12.

The first or lowermost stage 24 of the evaporator is a so-called heat input stage (as in FIGURE 1) and operates at a higher temperature and pressure than any of the other stages. For this purpose it is provided with a steam inlet 26 which receives steam from, say, a waste-heat boiler (not shown). The compartment 24 also has an outlet 28 for the extraction of steam condensate which collects within it.

As indicated above, the brine delivered by the nozzles 38 forms a thin downwardly-moving film on the upper slanting surfaces of the partitions 12. During operation of the evaporator part of this brine is evaporated, but the remainder collects in the troughs or valleys 40 of the partitions 12 and then passes into brine-extraction tubes 18 which connect the valleys 40 of the partitions 12 together and pass out through the sides of the vessel 10. Directly below each valley 40 in all the stages except the first one 24 is a distillate-collecting tray 20, the trays 20 in each stage being connected together by a distillate-extraction tube 22 which, like the brine extraction tubes 18, passes out through the sides of the vessel 10.

The evaporator described above operates in exactly the same way as that shown in FIGURE 1 except that the brine is sprayed through the nozzles 38 onto the crests 36 of the partitions 12 instead of being fed onto the upper surfaces of the partitions through simple inlets 16 in the side of the vessel 10.

A number of modifications can be made to the evaporators described above. For example, the source of heat in the evaporators illustrated is steam from a waste heat boiler, but it is also possible for liquid contained within the compartment 24 to be boiled by heat applied directly to the compartment. In this instance the heating medium can be spent gases of combustion from an internal combustion engine or a gas turbine. Alternatively, hot gases may be admitted into the compartment 24 and their heat transferred directly through the lowermost partition 12 to the brine in the next stage. Similarly, the flow of brine in the evaporators can follow any one of the systems listed below:

(1) A separate brine feed path and a separate brine extraction path is provided for each stage, the brine extracted from each stage being discharged to waste.

(2) The brine path passes in series through each of the stages from the first brine-containing stage to the last brine-containing stage.

(3) The brine path passes in series through each of the stages from the last brine-containing stage to the first brine-containing stage.

(4) Concentrated brine extracted from the last few brine-containing stages or the last brine-containing stage is mixed with fresh brine and recirculated through the earlier stages or through all the stages.

(5) Concentrated brine extracted from the first few brine-containing stages or the first brine-containing stage is mixed with fresh brine and recirculated through the later stages or through all the stages.

The flow of distillate in the evaporators can also follow several different schemes, among these being the two schemes given below:

(1) Distillate is extracted from each stage separately.
(2) Distillate is cascaded through each of the stages from the first distillate-containing stage to the last distillate-containing stage.

In certain cases it may be found desirable to pre-heat the brine before it enters the various stages of the evaporators so that its temperature on entering each stage approaches that at which the stage is operating. This may be done by utilizing the heat contained in concentrated brine or fresh distillate discharged from the evaporator to raise the temperature of brine which is about to be passed into the evaporator. The transfer of heat can be effected in a heat exchanger or, alternatively, in one or more auxiliary flash evaporators which receive hot concentrated brine and/or hot distillate from the main evaporator. This permits the concentrated brine or distillate to be flashed off so as to give up heat to fresh brine which passes through the heater section of the flash evaporator on its way to the main evaporator. Alternatively, the hot vapour produced by flashing off brine or distillate in one or more stages of the auxiliary evaporator may be fed into the appropriate stages or stage of the main evaporator.

The manner in which the brine is sprayed onto the upper slanting surfaces of the partitions 12 in FIGURES 2 and 3 can be widely varied. Thus, the headers 34 can be provided with brine discharge slits instead of a multiplicity of nozzles 38, and can be arranged between the crests 36 and below the level of the latter if it is considered desirable to spray the brine under some pressure against the slanting surfaces. Where it is desired to pass the brine in series through each of the stages, provision can be made, as shown in FIGURE 4, for brine which collects in the valleys 40 of the partitions 12 to be "bubbled up" through passages 42 onto the upper surfaces of the partitions 12 above them. The bubbling occurs due to the flashing of the brine as is passes through the restricted orifices 44 at the lower ends of the passages 42. In addition, water separators 46 can be arranged beneath the partitions 12 to prevent the vapour passing upwards towards the lower surfaces of the partitions 12 from entraining brine particles with it. The separators can be of very simple design and will generally take the form of curved plates arranged to whirl or abruptly change the direction of flow of the vapour.

In the particular evaporators shown in FIGURES 2–4 the lower surfaces of the partitions 12 slope at an angle of between 1° and 15° to the vertical. The angle of slope is not particularly critical, nor need the partitions 12 be of zig-zag cross-section. Thus, the partitions may include horizontal, vertical or curved surfaces, the main consideration being that they should present a large heat transfer surface area in comparison with the space which they occupy within the evaporator vessel 10. Further it is not necessary for the stages to be arranged one above the other, and in many instances it may prove more convenient to arrange the stages side by side in one or more horizontal lines.

A somewhat different form of evaporator in accordance with the invention is shown in FIGURE 5. Here the flat or zig-zag partitions 12 shown in FIGURES 1–4 are replaced by short tubes 48 and supporting plates 50 which therefore resemble tube-plates. Despite their different construction however, the plates 50 and the sets of tubes 48 together form partitions in the same way as the partitions 12 in the previous figures. This particular evaporator enables downward cascading of the brine from stage to stage to be readily obtained, the brine being partially flashed off as it passes through the constricted portion 52 of each tube 48. The funnels 54 at the tops of each set of tubes serve to catch the unevaporated brine from the stage immediately above them, while the vapour is used to heat the tubes from outside. Distillate outlets 22 are provided in the same way as in FIGURES 1–4.

A modification of the evaporator illustrated in FIGURE 5 is shown in FIGURE 6. The stages are stacked one above the other with the last stage lowermost, and hot feed water in the compartment 56 at the top of the vessel enters the top-most set of tubes 48 and flashes downwards into the next stage as it passes through the tubes. The top-most set of tubes carrying flashed-off vapour and brine is heated on its outer surface by steam which enters the evaporator from an external source through an inlet 26 and which causes the brine inside each tube 48 to boil. It will be noted that flash energy and hydrostatic head are both used to promote the rate of heat transfer inside the tubes by thinning out the surface film of brine and also increasing its flow velocity over the surface.

Vapour produced in this stage is then separated from the water and fed through moisture separators 46 into the condensing section 58 of the next stage where it gives up heat to brine flowing downwards through the tubes 48 of this stage. As the vapour is initially at the same temperature as the brine, a temperature gradient which is necessary for heat transfer to take place is obtained by producing some flashing-off in the constricted portion or nozzle 52 of each tube 48.

Each stage in the vessel takes brine and vapour from the stage immediately above it so that a very simple straight-through downward flow pattern is obtained. The vertical fall allows for the easy flow of brine and distillate from one stage to another, and the drop in pressure from stage to stage can be small as the said pressure is assisted by gravitational forces in passing the brine downwards. This makes it possible to use a large number of stages.

Distillate produced in each stage is flashed downwards through ducts 60 into the next stage to provide extra heating steam.

Fresh brine which enters the evaporator from a pump 62 is first pre-heated by means of the waste heat in the vapour, brine and distillate of the last stage before it passes to the main part of the evaporator. From the pre-heater 64 the brine feed flows upwards within the duct 66 (which will generally take the form of a tube bundle) through successive stages of the plant and is thereby heated by flashed-off vapour. At the top of the vessel a small amount of steam from an external source is supplied to a small heat exchanger 68 through an inlet 70 in order to boost the temperature of the brine feed up to the first stage entry conditions. The feed then enters the vessel 10 at the top and flows downwards, the highest brine concentration therefore being obtained in the last stage at the bottom of the vessel. This arrangement has the merit of simplicity.

A somewhat different arrangement for pre-heating the brine feed is shown in FIGURE 7 where fresh feed is supplied in parallel streams 72 to each stage and the bulk of this brine drained downwards through the stages. A smaller live steam feed heater can be used in this arrangement, and it has the advantage of maintaining a constant brine concentration throughout the plant which may prove necessary or desirable in some cases. Also, the area of the heat transfer surfaces for heating the feed water through the stages can be reduced by this method. This system of feed-heating is also applicable to the evaporators shown in FIGURES 1–4 of the drawings.

One of the advantages of the evaporators shown in FIGURES 5–7 is that, as the performance characteristics of each tube 48 can be readily determined, any increase in production from each stage necessitates only an increase in the number of tubes 48 or plates 50. It is thus possible to design blocks of tubes or plates in preformed units of a given output. Each stage can then be made up of unit blocks fastened together in the form of a tray, all the other stages being made up of these same units stacked one above the other.

In certain circumstances it may be advantageous to incorporate the evaporators shown in FIGURES 1–7 into some form of recompression cycle, for example, where high pressure steam is available, as the energy of this steam may be used to produce mechanical power and still yield a quantity of low grade steam for the heat input section of the evaporator. Mechanical power thus made available may be used to compress vapour at the outlet from one or more of the stages in order to feed it back into the heat input section of the evaporator at the condition of the heating steam. Where a turbo-compressor is used to compress the vapour, the exhaust steam from the turbine can then be fed into the heat input section and the pre-heater section of the evaporator. This reduces the quantity of fresh low grade steam required to heat the feed water and supply the heat input section so that the overall live steam consumption is reduced.

As an example of the benefit obtained by using re-compression in connection with a multi-stage evaporator in accordance with the invention, let us take the case of an evaporator working with a net gained output ratio of, say 20:1. If this plant uses 1 lb. of live steam to operate it, the distillate output will then be 20 lb. If, now, vapour is bled from the outlet from the last stage instead of rejecting all the heat in the vapour, it can then be compressed up to the "heat input" condition by means of the energy contained in the live steam supplied.

The turbo-compressor will require, say, 1 lb. of live steam to recompress 2 lb. of vapour at the lowest temperature condition. As the quantity of live steam required by this particular plant is 1 lb., then ⅓ lb. of steam must come from the high pressure supply and ⅔ lb. must come from the bled vapour. There will therefore be a reduction in the quantity of live steam required from 1 lb. to ⅓ lb. Due to the fact that the output of the evaporator remains constant at 20 lb./hr., the net gained output ratio will have increased from 20:1 to 60:1. Thus, there will be a 3:1 gain over the evaporator working on its own, that is to say, without re-compression.

FIGURE 8 shows a re-compression evaporator arranged to operate in the manner described above, the evaporator being of the same general design as that shown in FIGURE 6. Raw sea water is passed from the pump 62 into the pre-heater 64 and then upwards within the duct 66 through the various stages of the evaporator until it enters the "super-heater" housing 68. The brine feed temperature is then boosted up to the correct inlet temperature conditions of the first stage and the brine is passed into the top-most tubes 48 as described in connection with FIGURE 6. Each successive stage separates the vapour from the water/vapour mixture of the previous stage, and this vapour is used to boil the flashing brine previously separated from it. After reaching the last stage of the evaporator, the residual heat in the brine, distillate and vapour is utilised to pre-heat the brine feed in the pre-heater 64.

In order to effect re-compression of vapour in the evaporator, a turbine 74 is driven by high pressure live steam from a boiler. The exhaust steam from the turbine is fed to the super-heater 68 through a steam pipe 76, and a compressor 78 driven by the turbine is arranged to withdraw low pressure vapour from the evaporator at any of the bleed points 80, 82, 84 or 86. This vapour is then compressed and fed back to the evaporator through the pipe 88.

In those cases where vapour is bled from the points 80, 82 or 84 then there will be redistribution of the work done in the plant for any given output. Since less heating vapour passes downward to the next stage, less distillate will be produced in the lower stages, and the upper stages will have to be enlarged in order to produce the larger quantity of distillate desired. In certain circumstances this may yield some quite useful advantages over the other methods. The reduction in the proportion of work done in the lower stages will mean that the physical size of the lower sections can be reduced. Since the specific volume of the vapour in the low pressure stages is high, the extraction of a quantity of steam may help to reduce the proportion of the lower section.

Although the re-compression evaporator shown in FIGURE 8 is provided with a turbo-compressor 74, 78 some useful gain may also be obtained by using other compressor systems. For example, an ejector or a reciprocating compressor could be used instead of the turbo-compressor.

We claim:

1. Distillation apparatus comprising a vessel, partitions in said vessel dividing it into a series of distillation compartments disposed one above the other, with each succeeding compartment maintained at a lower pressure than the lower one preceding it, said partitions providing heat transfer surfaces between the compartments, liquid flow-controlling means feeding a moving film of liquid to be evaporated onto a first surface of each of said partitions, and distillate-collecting means disposed to receive distillate condensing on a second surface of each of said partitions at the opposite side of said partition to said first surface, said first and second surfaces of each partition constituting respective bounding walls of two consecutive compartments in the series of which two consecutive compartments that which is bounded by said first surface is maintained at a lower pressure than that which is bounded by said second surface, vapor generated in each compartment except the bottom, from the liquid film on said first surface of the respective partition whose first surface bounds said compartment, traversing the compartment and condensing on said second surface of the next partition in series thereby to evaporate liquid at a lower pressure from the film on said first surface of said next partition in the next upper compartment and means for heating the first surface of the lowermost partition.

2. A multi-stage evaporator according to claim 1 in which the partitions are walls having surfaces inclined to the horizontal so that liquid to be evaporated can flow down said first surfaces under gravity.

3. A multi-stage evaporator according to claim 1, in which the partitions are of zig-zag cross-section.

4. A multi-stage evaporator according to claim 1, in which the partitions are in the form of sets of open-ended vertical tubes supported in tube-plates.

5. A multi-stage evaporator according to claim 1, in which the liquid flow controlling means comprise sprays arranged to spray liquid to be evaporated onto said first surfaces.

6. A multi-stage evaporator according to claim 4, in which the liquid flow controlling means comprise constrictions in the tubes so as to induce partial flashing of the liquid passing through them.

7. A multi-stage evaporator according to claim 4, in which liquid-catching means are provided to catch the unevaporated liquid from one set of tubes and pass it to the next set of tubes.

8. A multi-stage evaporator according to claim 1, in which the distillate-collecting means comprise troughs arranged beneath the lower portions of said second surfaces.

9. A multi-stage evaporator according to claim 1, in which passages having constricted portions are provided for the upward transfer of liquid from compartment to compartment.

10. A multi-stage evaporator according to claim 1, in which vapour-compressing means are provided for re-compressing vapour bled from one or more compartments of the evaporator and returning it to the latter as the heating medium.

11. Distillation apparatus comprising:
a plurality of distillation compartments, said compartments being disposed one above another, each of said compartments having an inclined upper heat transfer wall constituting a condensing surface and an inclined lower heat transfer wall constituting an evaporating surface, means for conveying distilland from the lower edge of each of said evaporating surfaces to the upper edge of the next highest evaporating surface, means for introducing distilland to the lowest of said evaporating surfaces, means for collecting distillate from each of said condensing surfaces, and means for heating the lowest of said evaporating surfaces.

References Cited

UNITED STATES PATENTS

| 643,794 | 2/1900 | Harvey | 159—18 |
|---|---|---|---|
| 781,045 | 1/1905 | Brooke-Sewell | 202—174 |
| 1,524,184 | 1/1925 | Lawrence | 159—18 |
| 1,857,535 | 5/1932 | Elliston | 159—13 |
| 2,435,424 | 2/1948 | Crews | 159—18 |
| 2,759,882 | 9/1956 | Worthen et al. | 202—53 |

FOREIGN PATENTS 205,057  3/1955  Australia.

WILBUR L. BASCOMB, JR., *Primary Examiner.*

U.S. Cl. X.R.

159—15, 18; 202—173, 174, 236, 237; 203—11, 26, 88, 89, 90, 91